United States Patent
Dressendorfer et al.

(10) Patent No.: US 7,665,255 B2
(45) Date of Patent: Feb. 23, 2010

(54) CABLE DISTRIBUTION AND MANAGEMENT SYSTEM

(76) Inventors: Michael Dressendorfer, 352 Rebecca Ave., San Dimas, CA (US) 91773; Michael Cramer, 132 G Ave., Coronado, CA (US) 92118; Sasha Johnson, 2045 Chevy Chase Dr., Brea, CA (US) 92821

( * ) Notice: Subject to any disclaimer, the term of this patent is extended or adjusted under 35 U.S.C. 154(b) by 570 days.

(21) Appl. No.: 11/151,859

(22) Filed: Jun. 13, 2005

(65) Prior Publication Data

US 2006/0277833 A1  Dec. 14, 2006

(51) Int. Cl.
*E04C 2/52* (2006.01)
(52) U.S. Cl. ............... 52/220.7; 52/36.1; 108/50.02
(58) Field of Classification Search ........... 52/220.7, 52/239, 36.1, 34.4–34.6; 108/50.02, 50.01; 403/254; 211/192; 174/495, 497, 498; 439/215
See application file for complete search history.

(56) References Cited

U.S. PATENT DOCUMENTS

| | | | |
|---|---|---|---|
| 4,094,561 A * | 6/1978 | Wolff et al. ............... 312/223.6 |
| 4,224,768 A | 9/1980 | Denney | |
| 4,224,769 A * | 9/1980 | Ball et al. ..................... 52/36.1 |
| 4,535,577 A * | 8/1985 | Tenser et al. ................ 174/495 |
| 4,631,881 A * | 12/1986 | Charman .................... 52/220.7 |
| 4,948,205 A * | 8/1990 | Kelley .......................... 312/196 |
| 5,024,167 A * | 6/1991 | Hayward ................. 108/50.02 |
| 5,052,565 A * | 10/1991 | Zachrei ....................... 211/182 |
| 5,081,808 A * | 1/1992 | Bastian et al. .............. 52/220.7 |
| 5,183,406 A | 2/1993 | Glen | |
| 5,277,005 A | 1/1994 | Hellwig et al. | |
| 5,537,290 A * | 7/1996 | Brown et al. ................. 361/681 |
| 5,606,919 A * | 3/1997 | Fox et al. .................. 108/50.02 |
| 5,881,500 A * | 3/1999 | Latino et al. .................. 52/36.1 |
| 5,913,787 A | 6/1999 | Edwards | |
| 5,918,433 A * | 7/1999 | Reuter et al. ................ 52/220.7 |
| 6,088,981 A * | 7/2000 | Edwards ....................... 52/239 |
| 6,180,884 B1 * | 1/2001 | Tokunaga et al. ........... 174/659 |
| 6,301,846 B1 * | 10/2001 | Waalkes et al. ................ 52/239 |
| 6,408,579 B1 * | 6/2002 | Anderson et al. .......... 52/220.7 |
| 6,481,168 B1 * | 11/2002 | Hodges et al. ............. 52/220.7 |
| 6,658,805 B1 | 12/2003 | Yu et al. | |
| 6,910,306 B2 * | 6/2005 | Waalkes et al. ................ 52/239 |
| 2002/0017066 A1 | 2/2002 | Marshall et al. | |
| 2002/0053174 A1 | 5/2002 | Barmak | |
| 2002/0189180 A1 | 12/2002 | King et al. | |
| 2004/0035067 A1* | 2/2004 | Vander Park .................. 52/242 |
| 2007/0062898 A1* | 3/2007 | Choi ........................... 211/192 |

\* cited by examiner

*Primary Examiner*—Robert J Canfield
*Assistant Examiner*—Christine T Cajilig
(74) *Attorney, Agent, or Firm*—Kenneth L. Green; Edgar W. Averill, Jr.

(57) ABSTRACT

A cable management and distribution system comprises posts and beams. The posts may be one of several heights to accommodate various office layouts. The beams run between the posts and a cable entry slot runs the length of each beam to allow cable entry at any point along the beam. The beams further provide space for running and storing cables and fixed power outlets may be attached to the beam interior for plugging power cords. A lift off cap may be positioned over the beam, or a bridge may be positioned above the beam to provide a separate path for data cables. The bridge includes an upper face with a mounting surface for a privacy panel or the like, and accepts plain vertical side covers, or vertical side covers with accessory tracks. The posts include lower mounting points and the beams include upper mounting points for modesty panels.

18 Claims, 11 Drawing Sheets

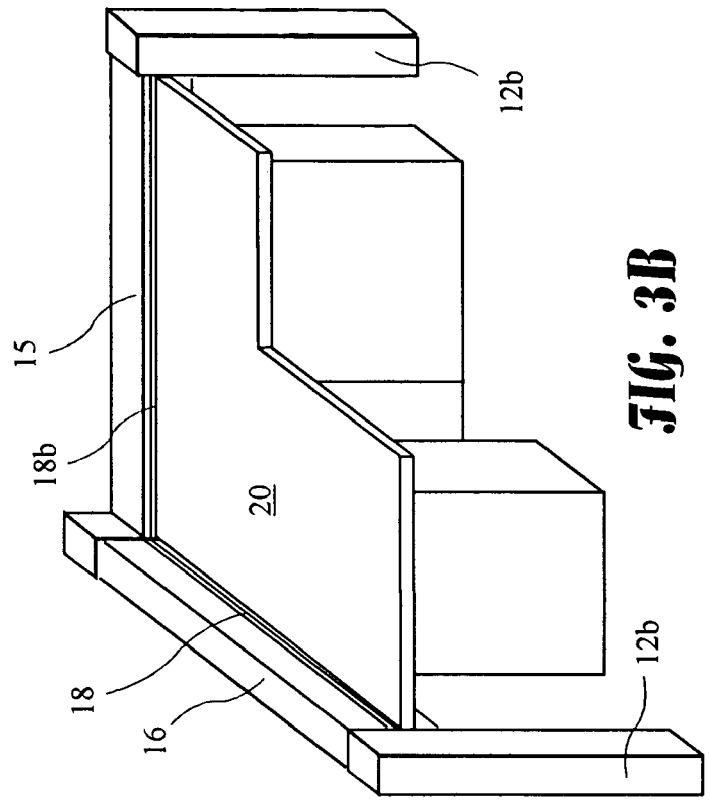
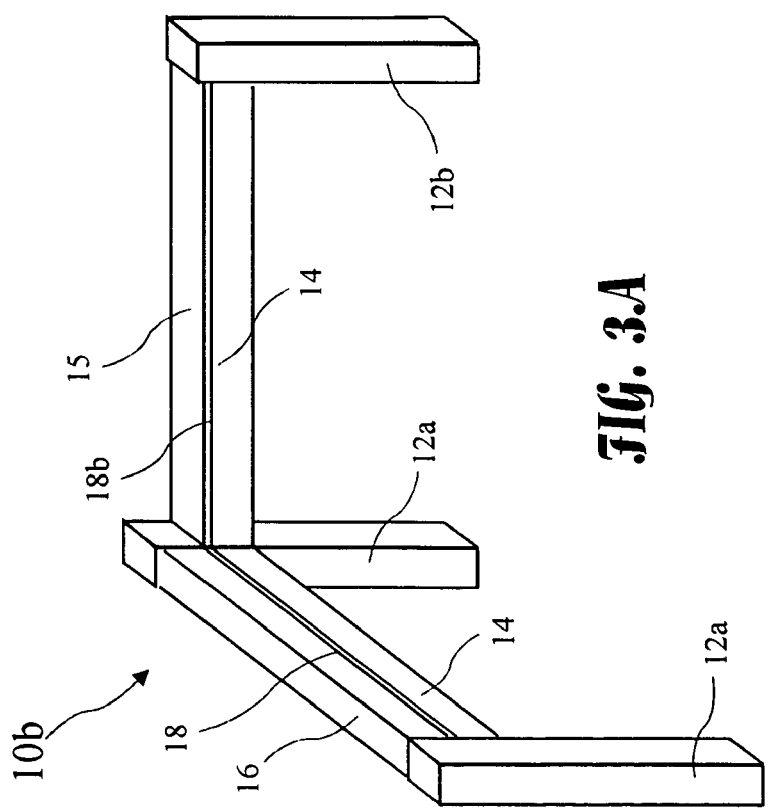
FIG. 3B
FIG. 3A

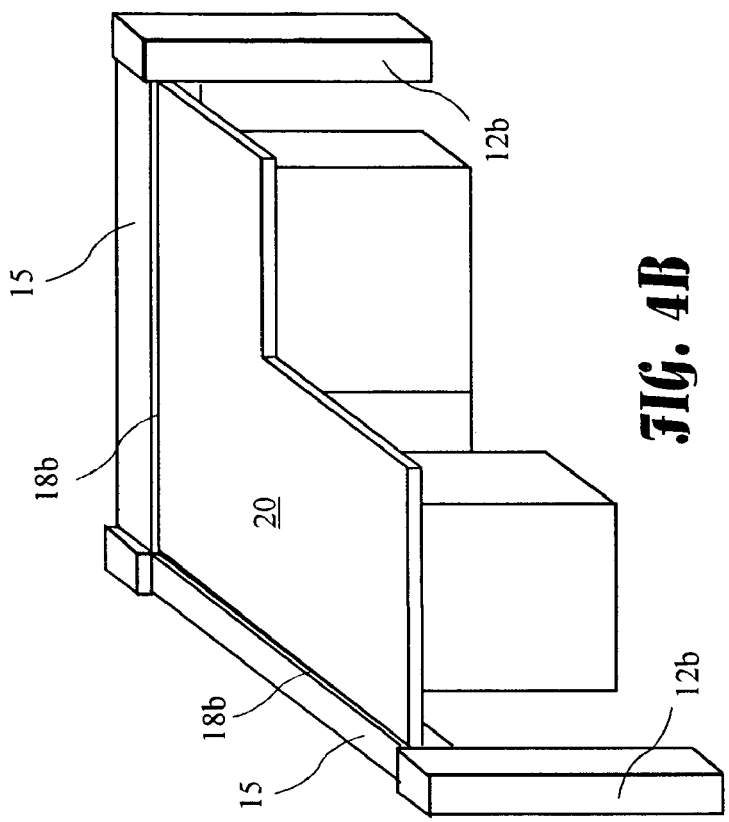
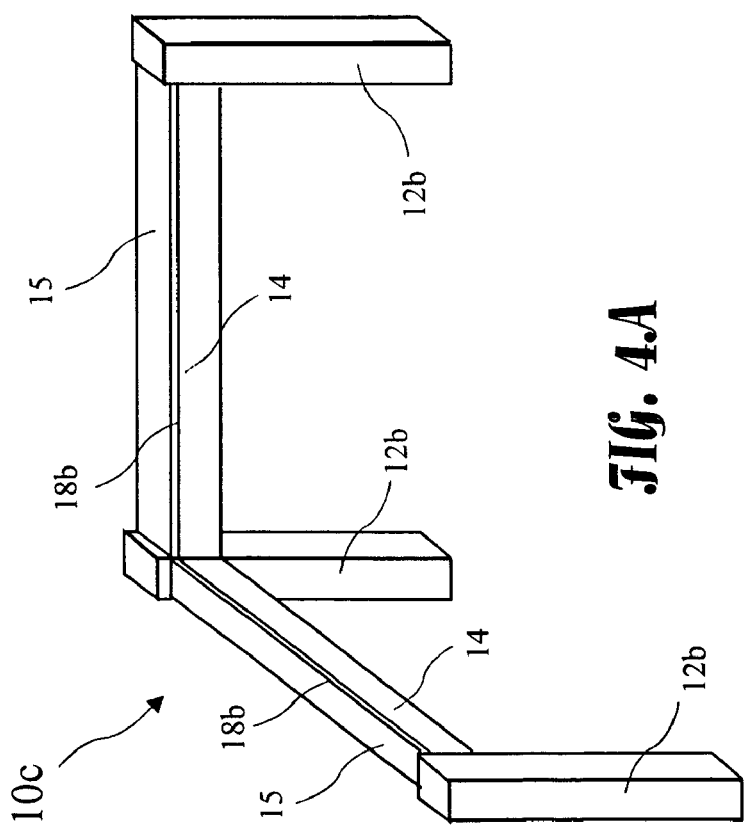

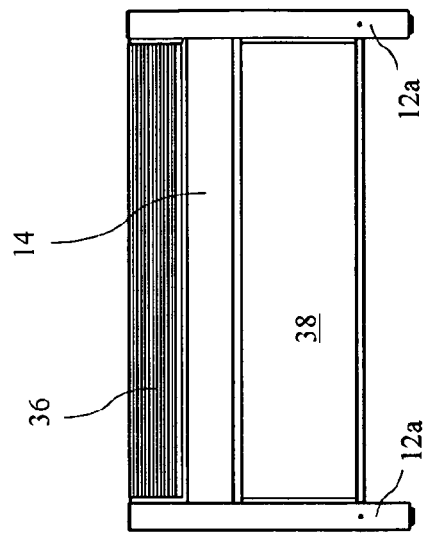
FIG. 5C
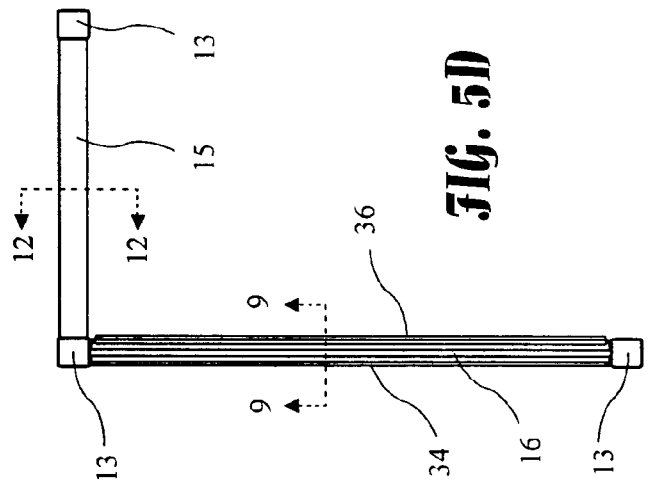
FIG. 5D
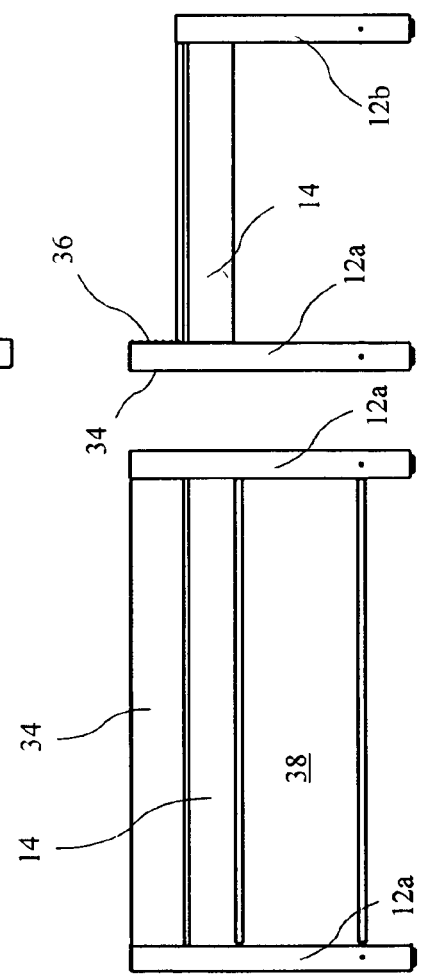
FIG. 5B
FIG. 5A

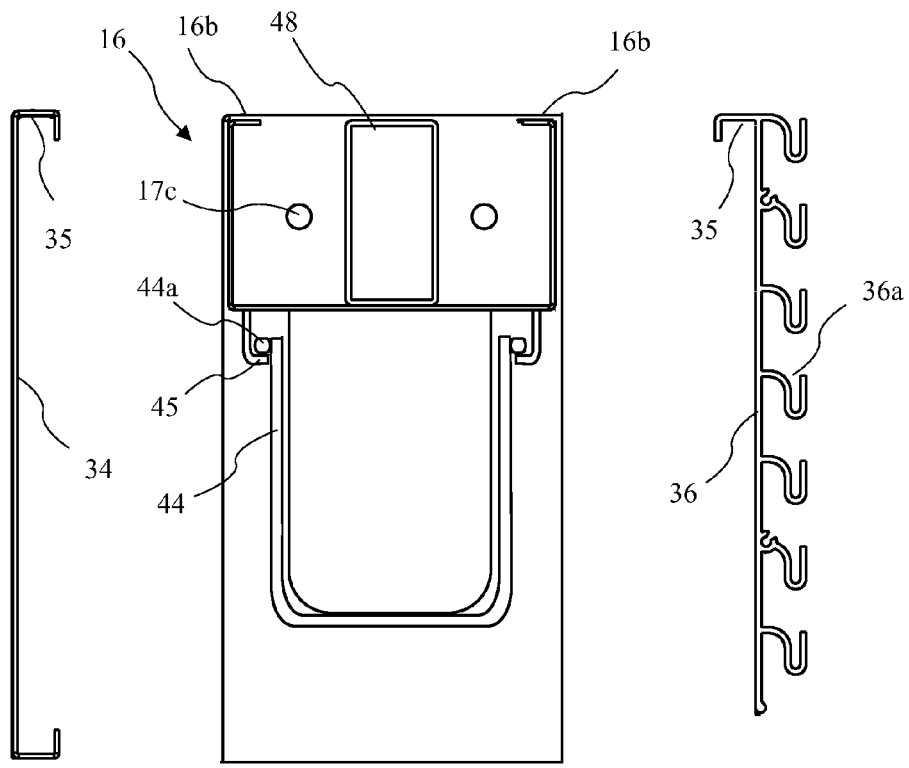
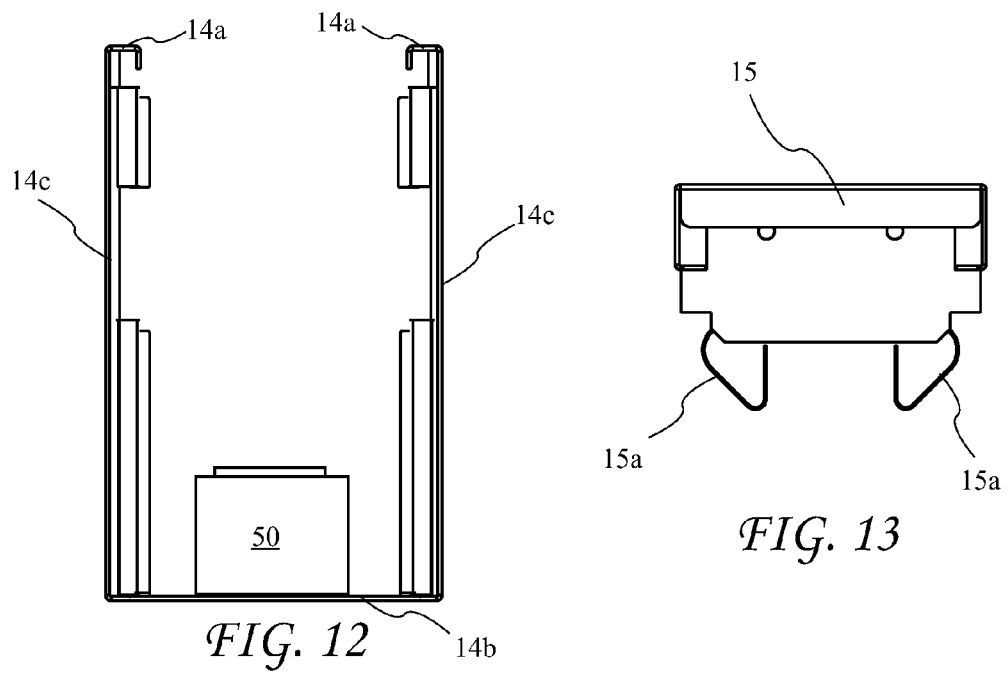
FIG. 10   FIG. 9   FIG. 11
FIG. 12   FIG. 13

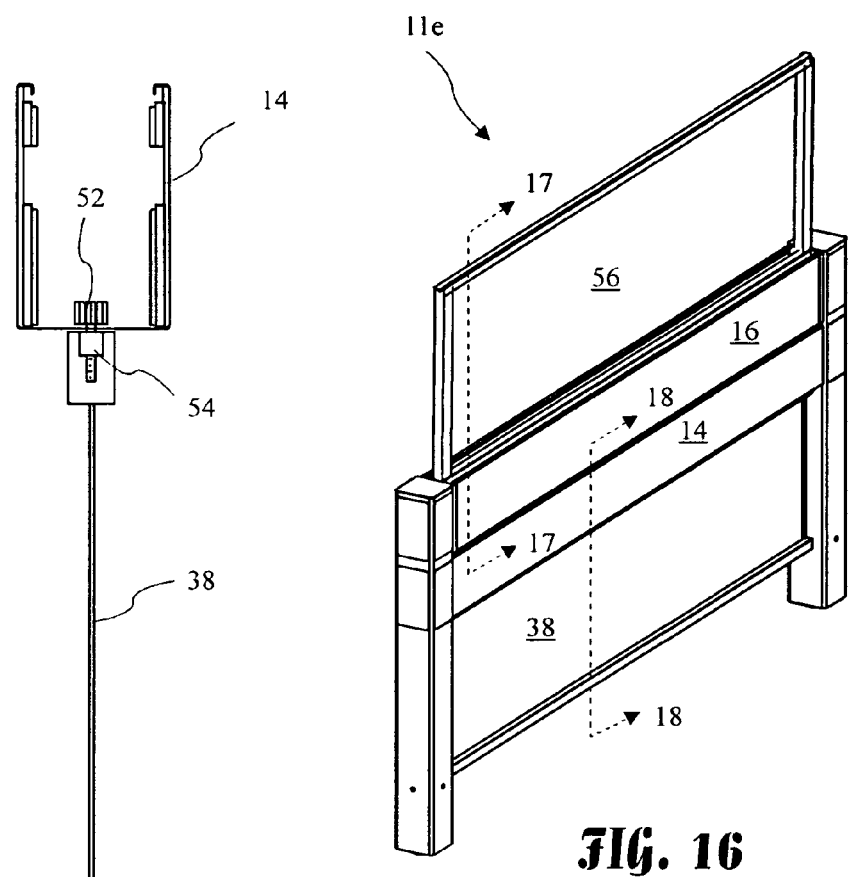
FIG. 16
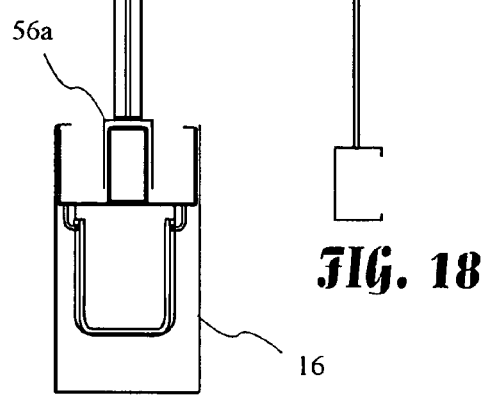
FIG. 17 FIG. 18
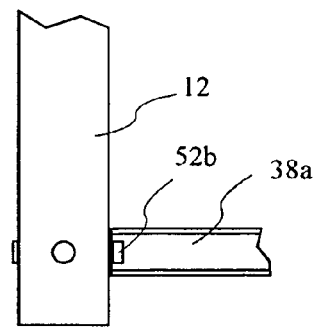
FIG. 19

CABLE DISTRIBUTION AND MANAGEMENT SYSTEM

BACKGROUND OF THE INVENTION

The present invention relates to cable distribution and in particular to a stand alone cable distribution and management system for use with office furniture.

Modern office workspace often comprises an open area with dividers separating desks, tables, files, and the like. With the advent of personal computers, internet connections, office networks, individual printers, local shared printers, etc. the number of cables running from a single work station (e.g., desk) has risen sharply. The result is both an unsightly appearance and difficulty in managing data and power cables. Such cluttered workplaces present an poor image to customers and does not provide the desired motivation to employees. Mingled cables make maintenance and upgrading of cabling difficult and time consuming.

Office partitions have been provided which include internal wiring and external outlets. Such partitions are intended to be permanently cabled and lack easy access to add, remove, or adjust wiring. Because these partitions include external outlets, excess cable length of computer and other cables generally remains exposed and unsightly. Therefore, a need remains to an effective and attractive cable management system.

BRIEF SUMMARY OF THE INVENTION

The present invention addresses the above and other needs by providing a cable management and distribution system which comprises posts and beams. The posts may be one of several heights to accommodate various office layouts. The beams run between the posts and a cable entry slot runs the length of each beam to allow cable entry at any point along the beam. The beams further provide space for running and storing cables, and fixed power outlets may be attached to the beam interior for plugging power cords. A lift off cap may be positioned over the beam, or a bridge may be positioned above the beam to provide a separate path for data cables. The bridge includes an upper face with a mounting surface for a privacy panel, posting self, or other accessories, and accepts plain vertical side covers, or vertical side covers with accessory tracks commonly called a slat wall. The posts include lower mounting points and the beams include upper mounting points for modesty panels.

In accordance with one aspect of the invention, there is provided a cable management and distribution system comprising at least two posts and at least one beam supported by the posts. A bridge resides above each of the at least one beam. A first cable passageway resides in the beam and a second cable passageway resides in the bridge. A cable entry slot has a vertical gap and runs substantially the beam length along the at least one beam.

In accordance with another aspect of the invention, there is provided a free standing cable management and distribution system comprising at least two posts and at least one beam supported by the posts. An upper member resides above each of the at least one beam and a first cable passageway resides in the beam. Cable entry slots define vertical gaps and run substantially the beam length along opposite sides of the at least one beam and reside between top edges of the at least one beam and the upper member. Electrical outlets are provided in the at least one beam for connecting the cables.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 3A is a perspective view of a second embodiment of the cable distribution and management system according to the present invention.

FIG. 3B is a perspective view of the second embodiment of the cable distribution and management system and the desk.

FIG. 4A is a perspective view of a third embodiment of the cable distribution and management system according to the present invention.

FIG. 4B is a perspective view of the third embodiment of the cable distribution and management system and the desk.

FIG. 5A is a rear view of the cable distribution and management system.

FIG. 5B is a side view of the cable distribution and management system.

FIG. 5C is a front view of the cable distribution and management system.

FIG. 5D is a top view of the cable distribution and management system.

FIG. 9 is a cross-sectional view of the bridge take along line 9-9 of FIG. 5D.

FIG. 10 is a side edge of view of a plain side cover for the bridge.

FIG. 11 is a side edge view of a side cover with tracks for the bridge.

FIG. 12 is a cross-sectional view of the beam taken along line 12-12 of FIG. 5D.

FIG. 13 is a cross-sectional view of the cap taken along line 12-12 of FIG. 5D.

FIG. 16 is a perspective view of a section of the cable distribution and management system including a privacy panel and a modesty panel.

FIG. 17 is a cross-sectional view of the privacy panel and bridge taken along line 17-17 of FIG. 16.

FIG. 18 is a cross-sectional view of the modesty panel taken along line 18-18 of FIG. 16.

FIG. 19 is a detailed view of an attachment of the modesty panel to the beam.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
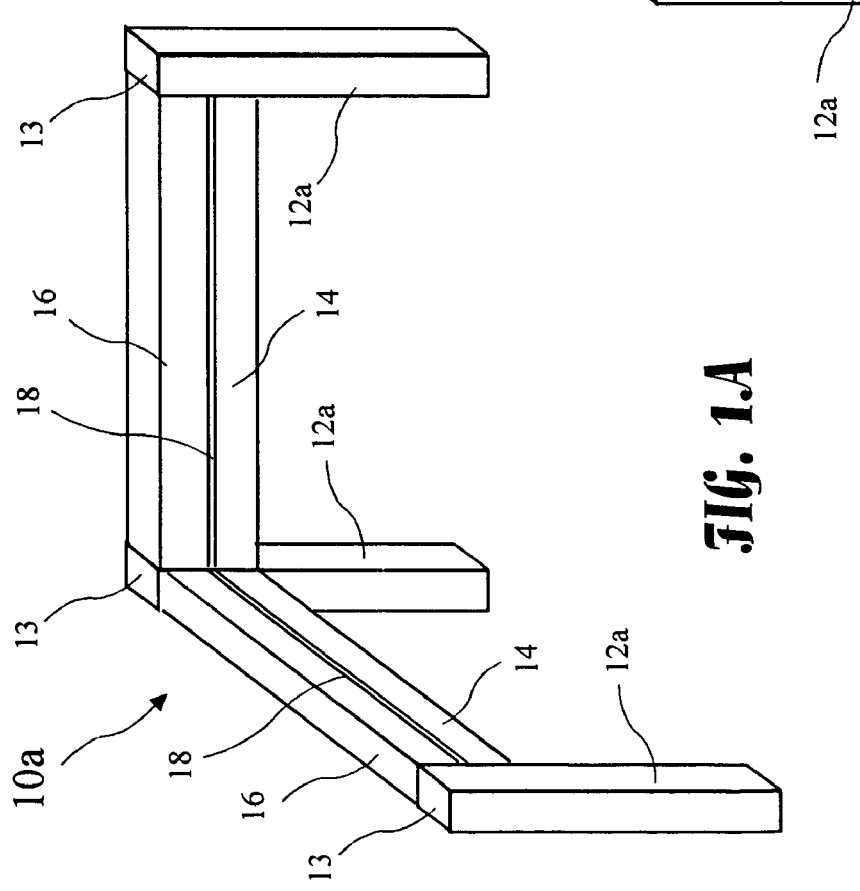
FIG. 1A is a perspective view of a first cable distribution and management system according to the present invention.
Figure 1B:
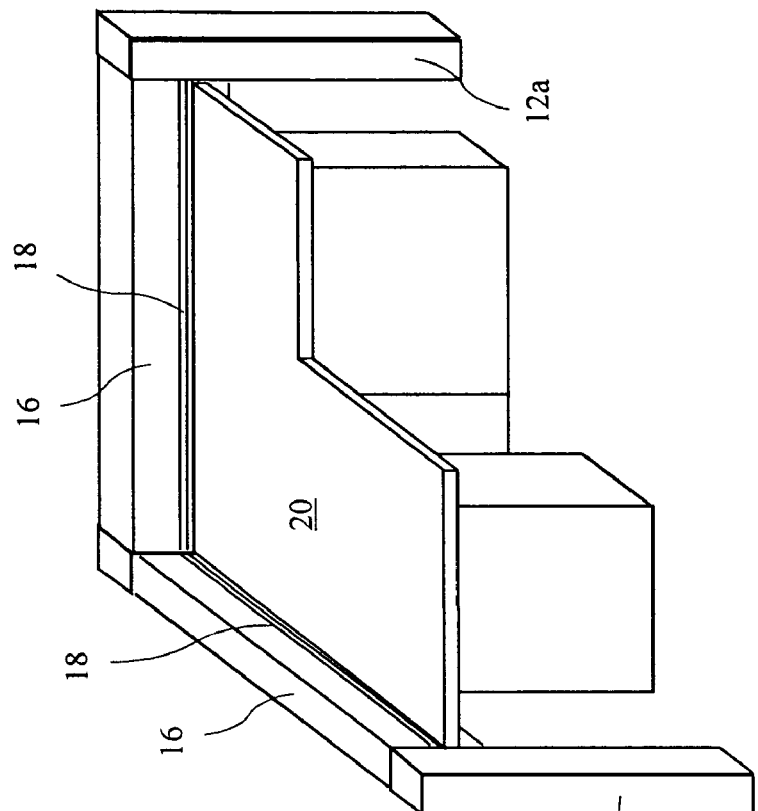
FIG. 1B is a perspective view of the first cable and distribution and management system and a desk.

A perspective view of a first cable distribution and management system 10a according to the present invention is shown in FIG. 1A, and a perspective view of the cable and distribution and management system 10a and a desk 20 is shown in FIG. 1B. The cable distribution and management system 10a comprises beams 14 supported by first posts 12a. An upper member comprising a bridge 16 resides above the beam 14. Cable slots 18 reside between the beams 14 and the bridges 16. The cable slots 18 run horizontally and preferably define a vertical gap thereby allowing cables to enter the beams 14 and/or the bridges 16 and allowing routing and/or storage of cables. Removable post caps 13 reside on top of the posts 12a and the desk 20 resides against the beams 14 with a top surface of the desk 20 preferably even with or just below the cable slot 18.

Figure 2:
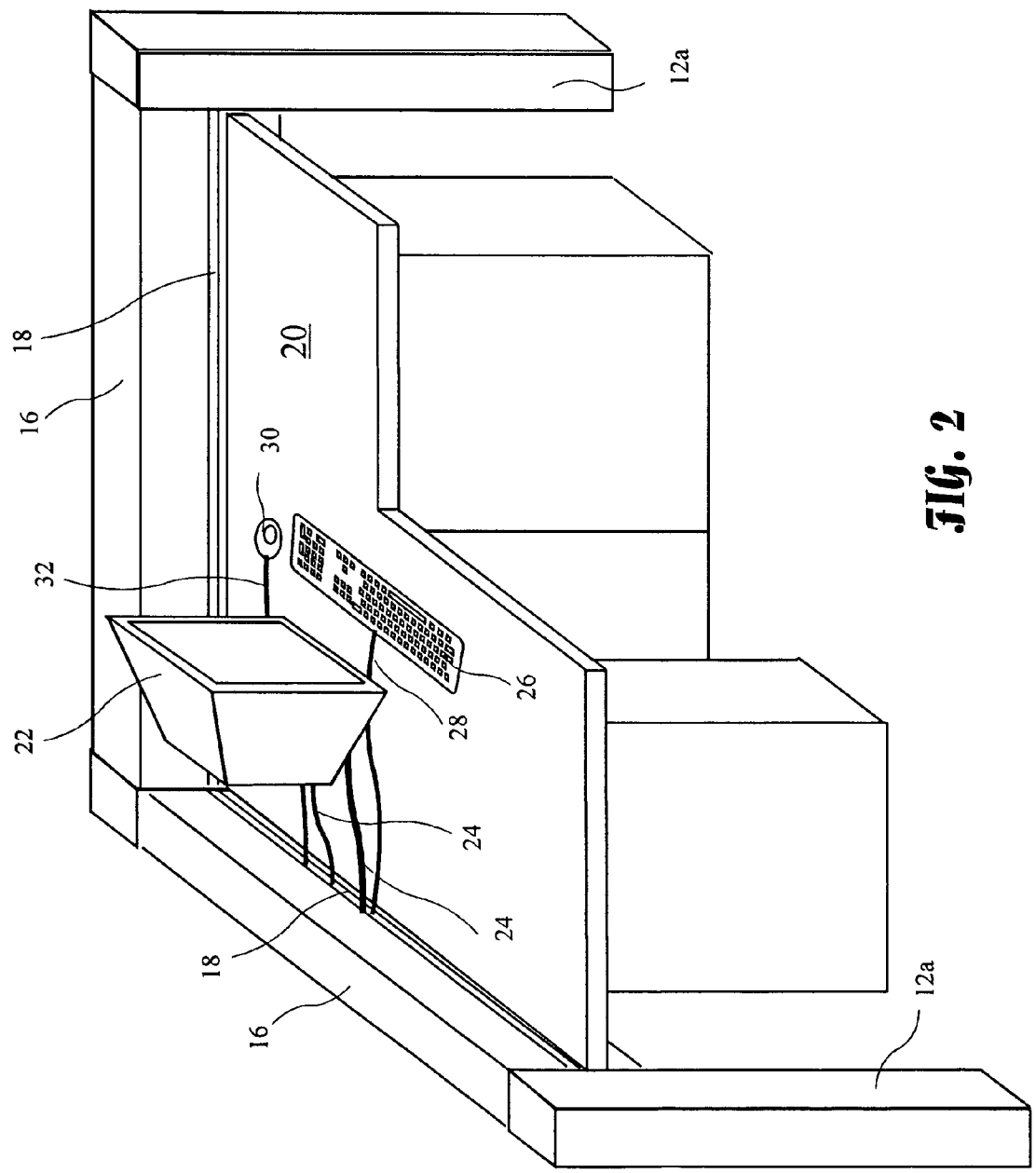
FIG. 2 is a more detailed perspective view of the first cable distribution and management system and the desk with a computer monitor, keyboard, and mouse residing on the desk.

A more detailed perspective view of the cable distribution and management system 10a and the desk 20 with a computer monitor 22, keyboard 26, and mouse 30 residing on the desk 20 is shown in FIG. 2. The cables 24 from the monitor 22, keyboard 26, and mouse 30 run across the top of the desk 20 and into the cable slot 18. The cable slot 18 runs along the beam 14 substantially the entire length (the slot may end before the ends of the beam to allow for end caps etc. on the beam) of the beam 14, and preferably runs the entire length of the beam 14. Such continuous running cable slot 18 allows the cables 24 to enter the beam 14 at a closest point, and provides a very inconspicuous appearance. Further, the cable slot 18 preferably define a horizontally running vertical gap thereby minimizing objects falling through the cable slot 18.

A perspective view of a second embodiment of the cable distribution and management system 10b according to the present invention is shown in FIG. 3A, and a perspective view of the second embodiment of the cable distribution and management system 10b and the desk 20 is shown in FIG. 3B. The cable distribution and management system 10b includes two of the first posts 12a and one second post 12b. The bridge 16 and the beam 14 reside between the posts 12a, and the beam 14 and an upper member comprising a cap 15 residing above the beam 14 reside between one of the posts 12a and the post 12b. A vertical gap between the cap 15 and the beam 14 creates a second cable slot 18b.

A perspective view of a third embodiment of a cable distribution and management system 10c according to the present invention is shown in FIG. 4A, and a perspective view of the third embodiment of the cable distribution and management system 10c and the desk 20 is shown in FIG. 4B. The cable distribution and management system 10c includes the beams 14 and caps 15 residing between pairs of the second posts 12b. The second cable slots 18b reside between the beams 14 and the caps 15.

A rear view of the cable distribution and management system 10b is shown in 5A, a side view of the cable distribution and management system 10b is shown in FIG. 5B, a front view of the cable distribution and management system 10b is shown in FIG. 5C, and a top view (or foot print) of the cable distribution and management system 10b is shown in FIG. 5D. A modesty panel 38 resides below the beam 14 between the posts 12a. A plain vertical side cover 34 resides on one side of the bridge 16, and a vertical side cover with tracks 36 resides on an opposite side of the bridge 16. The side cover with tracks 36 provides tracks and preferably provide a slat wall for attaching accessories to the cable distribution and management system 10b, and the side cover with tracks 36 may reside on one side of the bridge 16, both sides of the bridge 16, or the plain cover 34 may reside on both sides of the beam 16.

Figure 6A:
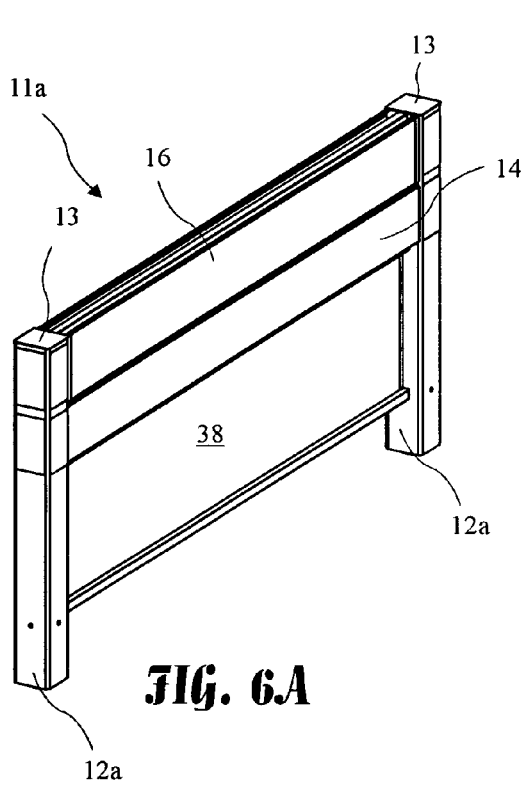
FIG. 6A is a perspective view of a starter section including a bridge above a beam.
Figure 6C:
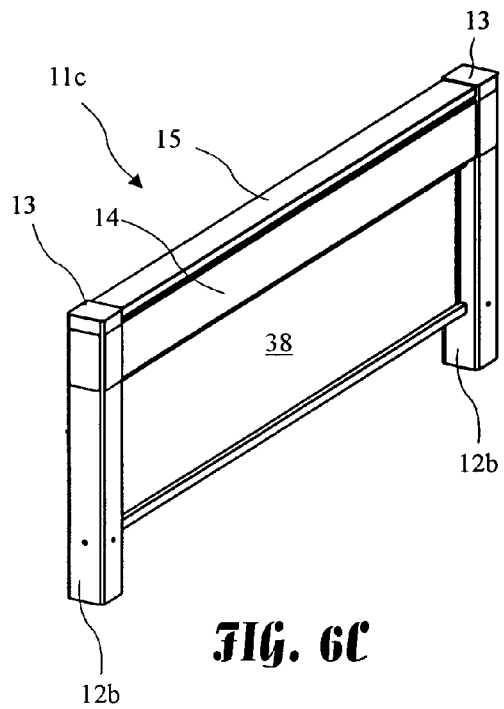
FIG. 6C is a perspective view of a starter section including a cap above the beam.
Figure 6B:
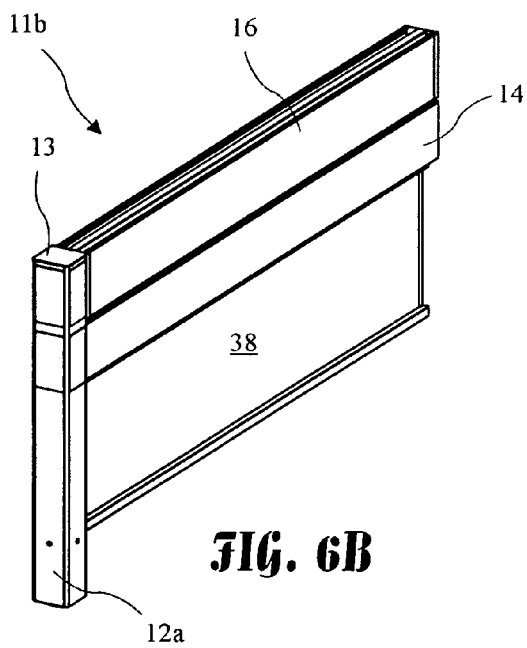
FIG. 6B is a perspective view of an add-on section including the bridge above the beam.

A perspective view of a starter section 11a including the bridge 16 above the beam 14 is shown in FIG. 6A, and a perspective view of an add-on section 11b including the bridge 16 above the beam 14 is shown in FIG. 6B. The starter section 11a may be used alone if supported, and the add-on section 11b may be attached to one of the posts 12a of the starter section 11a to form a cable distribution and management system 10a (see FIG. 1A). When the add-on section 11b is attached at a 90 degree angle to the starter section 11a, the cable distribution and management system 10a is self supporting.

Figure 6D:
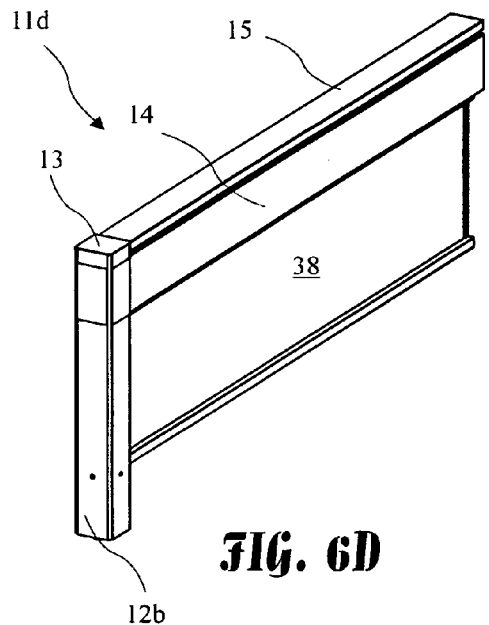
FIG. 6D is a perspective view of an add-on section including the cap above the beam.

A perspective view of a second starter section 11c including a cap 15 above the beam 14 is shown in FIG. 6C, and a perspective view of a second add-on section 11d including the cap 15 above the beam 14 is shown in FIG. 6D. The second starter section 11c and the second add-on section 11d may be combined as described for the starter section 11a and add-on section 11b in FIGS. 6A and 6B to form the cable distribution and management system 10c (see FIG. 4A). Further, the second add-on section 11d may be attached to the starter section 11a to form the cable distribution and management system 10b (see FIG. 3A).

Figure 7:
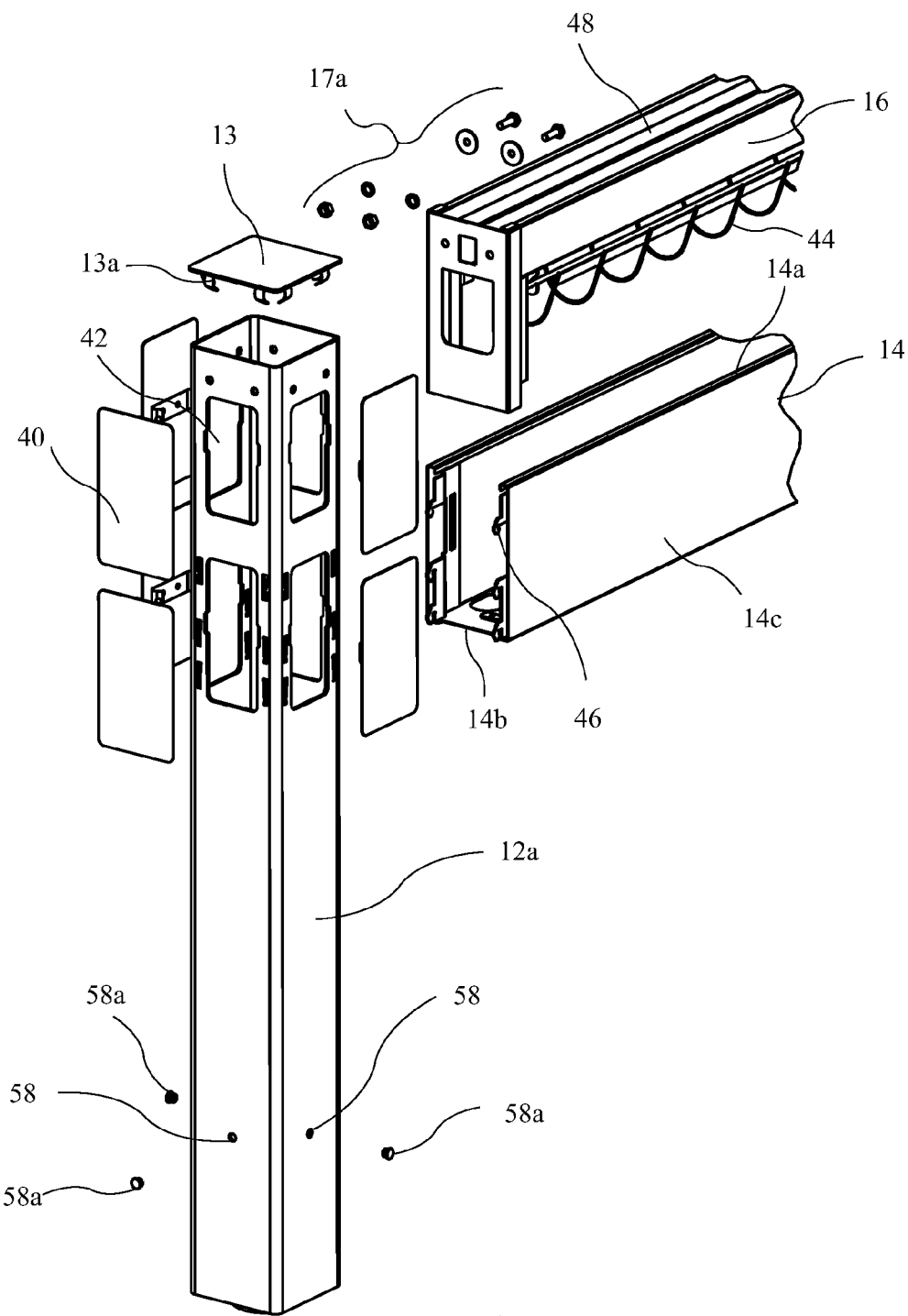
FIG. 7 is a detailed perspective view of a post and cooperating ends of the bridge and the beam.
Figure 8:
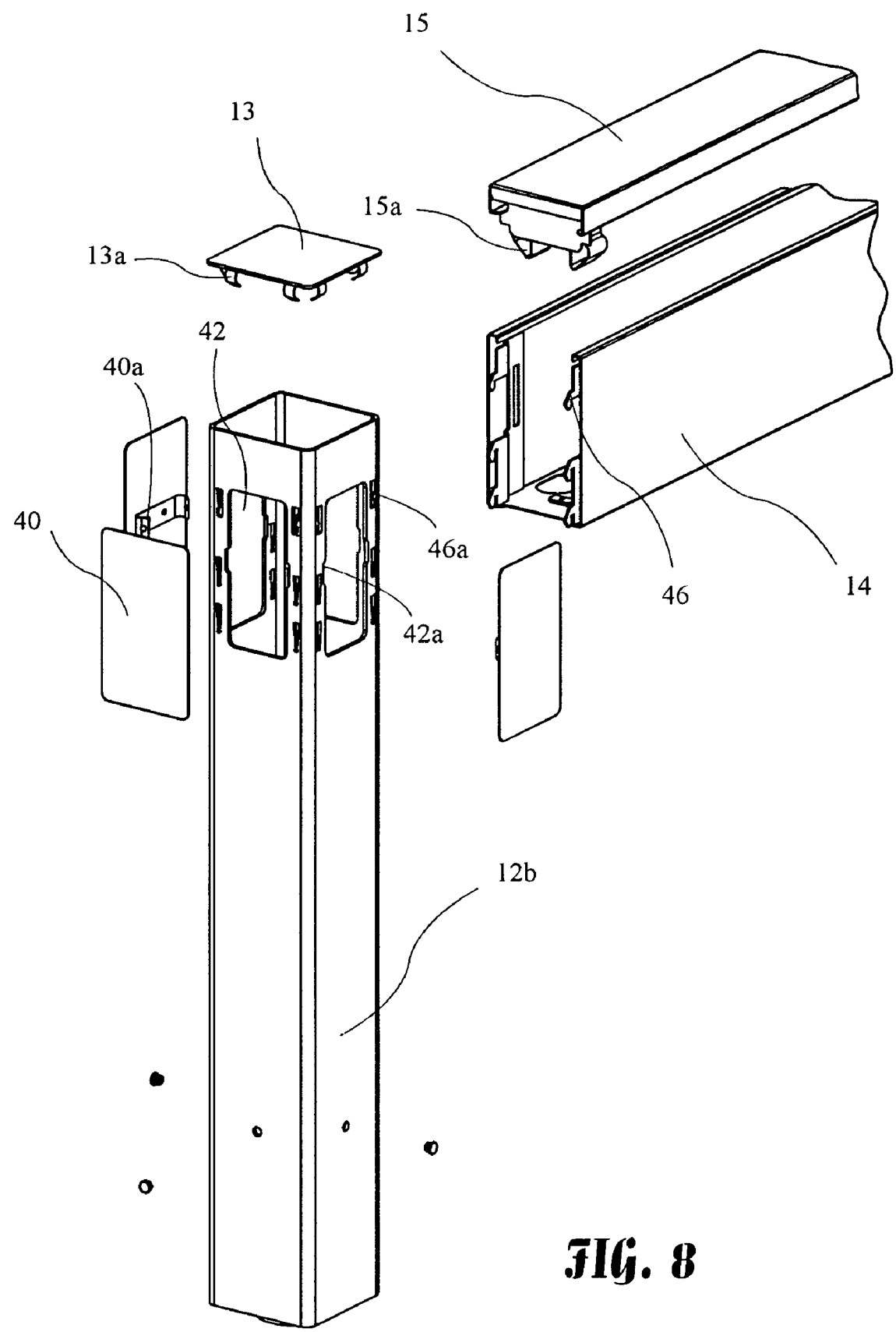
FIG. 8 is a detailed perspective view of a post and cooperating ends of the cap and the beam.

A detailed perspective view of a post 12a and cooperating ends of the bridge 16 and the beam 14 are shown in FIG. 7, and a detailed perspective view of a post 12b and cooperating surfaces of the cap 15 and the beam 14 are shown in FIG. 8. The beam 14 is rectangular with a flat horizontal base 14b, fixed vertical sides 14c extending up from the base 14b and an open top to allow entry and management of cables therein, thus providing a cable passageway and storage area. The posts 12a and 12b includes post entries 42. Entry covers 40 may be attached to the post entries 42 using cover clips 40a attached to the entry covers 40 which engage notches 42a in the post entries 42 to position and hold the entry covers 40 in place. The beam 14 includes hooks 46 which engage slots 46a in the posts 12a and 12b. The bridge 16 is preferably attached to the post 12a using first fastener sets 17a. The hooks 46 preferably comprise six hooks 46 attaching each end of the beam 14, and the fastener sets 17a preferably comprise two sets of the screws, nuts, and washers attaching each end of the bridge 16 to the post 12a. Alternatively, the beam 14 may be attached by a combination of four hooks and two threaded fasteners.

A basket 44 formed from horizontally spaced apart closed bottom vertical loops resides in the bridge 16 and provides a second cable passageway allowing data cables to be separated from power cables where desired. In order to provide easy access to the interior of the beam 14 and bridge 16 (FIG. 7), side covers 34 and 36 (see FIGS. 10 and 11) pivot or lift away from the bridge 16. When the side covers 34 and 36 are pivoted or lifted away from the bridge 16, space is provided between the basket 44 and beam top edges 14a to allow a hand to reach into the beam 14 to reach cables or outlets 50 (see FIG. 12) residing in the beam 14. The space is preferably approximately three inches across. The space between top edges 14a is also sufficient to allow a hand to reach into the beam 14, and is preferably approximately three inches. The beam 14 has sufficient height to provide structural strength to the cable management system and is preferably between approximately four and approximately six inches in height, and more preferably approximately six inches in height.

The cap 15 includes cap clips 15a which enter and engage the open top of the beam 14 to hold the cap 15 in place. The cap 15 is preferably attachable and removable from the beam 14 by pushing the cap 15 onto the beam 14 and by pulling the cap 15 from the beam 14. When the cap 14 is attached to the beam 14 the vertical cable slot 18 (see FIG. 2) provides an opening for entry of cables into the beam 14. The posts 12a are preferably approximately 37 inches high, and the posts 12b are preferably between approximately 18 inches high and approximately 31 inches high, and the posts 12b are more preferably approximately 31 inches high.

A cross-sectional view of the bridge 16 take along line 9-9 of FIG. 5D is shown in FIG. 9. The bridge 16 includes a mounting surface 18 for attaching accessories, for example a privacy panel 56 (see FIG. 16) to the bridge 16. The bridge 16 also includes a basket 44 (also see FIG. 7) running substantially the length of the bridge 16 to provide support for cables in the bridge 16 and where desired, to separate data cables from power cables. The basket 44 includes a hand portion 44a along one or both top edges of the basket 44. The hand portion engages ledges 45 attached to the bridge 16. The hands 44a preferably run the length of the basket 44 and the ledges 45 preferably provide continuous support to the basket 44 for the length of the bridge 16. The basket 44 may be a single continuous basket running most of, or the entire length of, the bridge 16, or two or more baskets may combine end to end to run most of, or the entire length of, the bridge 16. By disengaging the hands 44a from the ledges 45, the basket 44 may be opened to access cables. The hands 44a may be disengaged from the ledges 45 by pressing the top edge of the basket inward.

A side edge view of the plain side cover 34 for the bridge 16 is shown in FIG. 10, and a side edge view of the side cover with tracks 36 for the bridge 16 is shown in FIG. 11. The side covers 34 and 36 include cover hooked portions 35 which hook over top edges 16b of the bridge 16 to hang the covers 34 and 36 on sides of the bridge 16. The side covers 34 and 36 provide easy access to the interior of the bridge 16 and the beam 14 for adding, removing, and adjusting cables in the bridge 16 and/or the beam 14. The side covers 34 and 36 may be pivoted about the hooked portions 35 to gain access to the bridge 16 and/or the beam 14, or may be removed by lifting approximately vertically. Such easy vertical removal allows the side covers 34 and 36 to be removed when equipment, for example monitors, reside close to the side covers 34 and 36. The cover with tracks 36 includes tracks on an outward facing surface, allowing accessories to be attached to the bridges, for example, a monitor support, file shelves, phone support, etc.

A cross-sectional view of the beam 14 taken along line 12-12 of FIG. 5D is shown in FIG. 12. A fixed connector 50 for power or data connection (for example, a power outlet, phone line receptacle, internet cable receptacle, or any electrical connector) may reside inside the beam 14 on the flat base 14b between the sides 14c to provide a convenient power source. The connector 50 may be attached or loose. By providing easy access to the interiors of the beam 14 and the bridge 16 using the cap 15 or side covers 34 and 36, cables may be easily added or removed from the fixed connector 50, thus overcoming common cabling issues.

A cross-sectional view of the cap 15 taken along line 12-12 of FIG. 5D is shown in FIG. 13. The clips 15a (also see FIG. 8) extend downward from the cap 15 to attach the cap 15 to the beam 14. The cap 15 and the side 34 and 36 comprise easy access panels providing easy access to the interiors of the beam 14 and the bridge 16. The easy access panels are easily openable or removable to allow the addition, removal, or adjustment of cables inside the beam 14 and the bridge 16, and the easy access panels are preferably openable or removable without the use of tools. The easy access panels also allow hand access to cables in the beam 14 and the bridge 16.

Figures 14, 15:
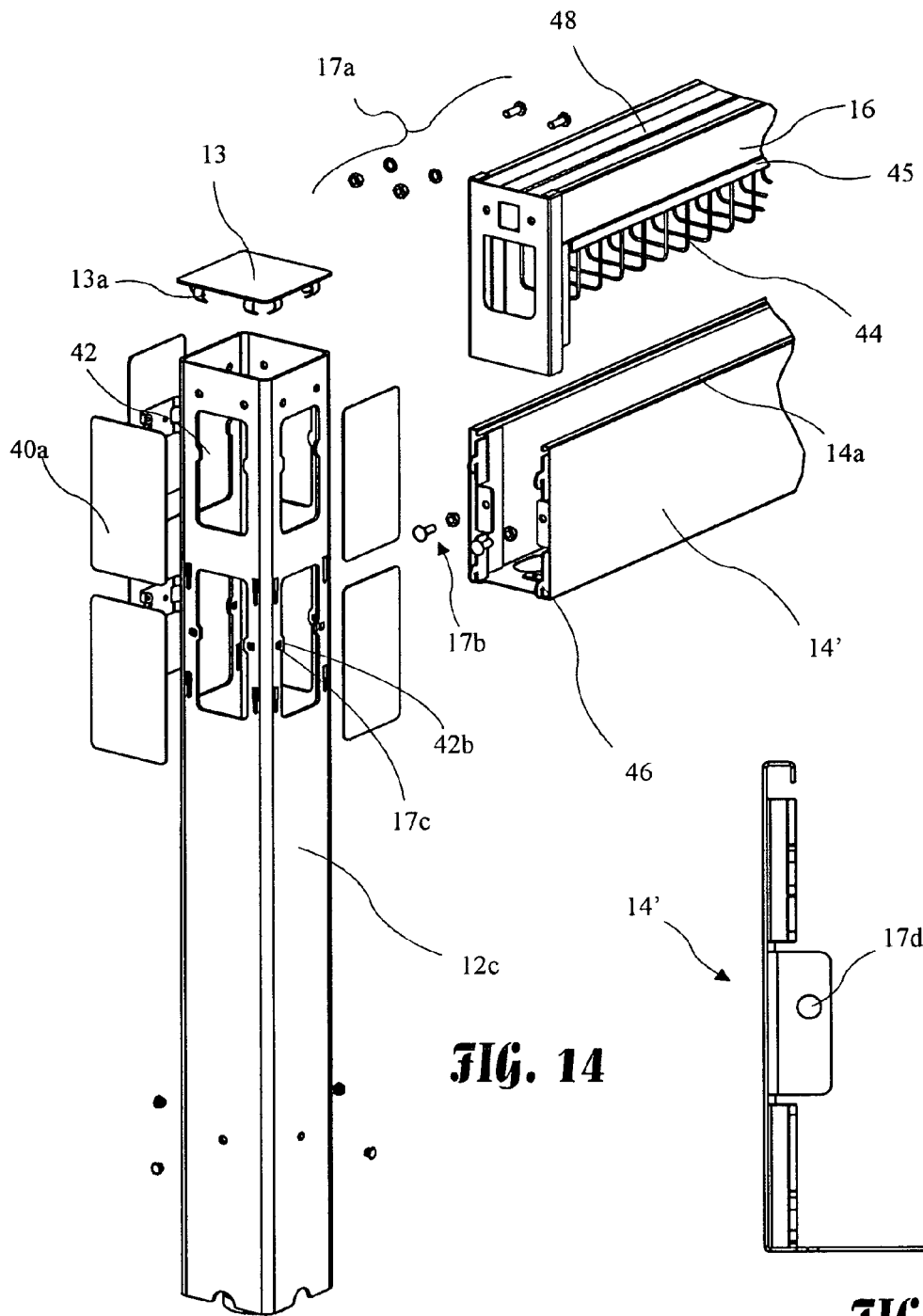
FIG. 14 is a second embodiment of the bridge and beam cooperation with the post.
FIG. 15 is a cross-sectional view of a second embodiment of the beam taken along line 12-12 of FIG. 5D.

A second embodiment of the bridge 16 and second beam 14' cooperation with a third post 12c is shown in FIG. 14, and a cross-sectional view of the second beam 14' taken along line 12-12 of FIG. 5D is shown in FIG. 15. The beam 14' is attached to the post 12c by a combination of four hooks 46 and two threaded fastener sets 17b. The threaded fastener sets 17b facilitate drawing the beam 14; and post 12c together for a firm fit. The post 12c include pairs of passages 17c on each of the four sides of the post 12c and the beam 14' includes pairs of passages 17d on each beam 14' end for the fasteners 17b. Second covers 40a cooperate with tabs 42b to retain the covers 14a on the post entries 42.

A perspective view of a section 11e of the cable distribution and management system including a privacy panel 56 and a modesty panel 38 is shown in FIG. 16. A cross-sectional view of the privacy panel 56 and the bridge 16 taken along line 17-17 of FIG. 16 is shown in FIG. 17. The privacy panel 56 includes a base 56a configured to cooperate with the mounting surface 48 to support the privacy panel 56.

A cross-sectional edge view of the modesty panel 38 taken along line 18-18 of FIG. 16 is shown in FIG. 18, and a lower mounting point for the modesty panel 38 is shown in FIG. 19. The modesty panel 38 is attached to the bottom of the beam 14 by a knurled (or thumb) first screw 52a screwed into a nut 54 which is preferably a weld nut. A lower frame portion 38a of the modesty panel 38 is attached to an attaching point 58 (see FIG. 7) of the post 12a or 12b by a second screw 52b.

While the invention herein disclosed has been described by means of specific embodiments and applications thereof, numerous modifications and variations could be made thereto by those skilled in the art without departing from the scope of the invention set forth in the claims.

We claim:

1. A cable management and distribution system comprising:
   at least two vertical posts;
   at least one beam having a flat horizontal base and fixed vertical sides extending up from the base and an open top, one of the at least one beam running horizontally between adjacent pairs of the posts and supported by the posts;
   at least one beam top edge defining a highest portion of a corresponding side of the at least one beam;
   a power cable passageway and storage area in the at least one beam extending the length of the at least one beam and being accessible through the open top of the at least one beam and containing power cables and at least one power outlet residing inside the at least one beam between the fixed vertical sides and accessible through the open top of the at least one beam;
   an open bottom horizontally residing bridge spaced vertically apart directly above the at least one beam and running horizontally and parallel to the at least one beam and containing a data cable passageway spaced vertically apart above the power cable passageway and above the beam top edge and having at least one independently opening and vertically residing side cover running the length of the bridge to and opening to allow access to both the power cable passageway and the data cable passageway; and a cable entry slot defining a vertical gap remaining open at all times between and defined by the at least one beam top edge and the bottom of the vertically residing side cover of the bridge when the vertically residing side cover is in a vertical closed position, the cable entry slot running along the at least one beam, the cable entry slot configured to provide for entry from outside the cable management and distribution system of cables into the power cable passageway and storage area and into the data cable passageway, while the at least one side cover is closed, wherein the cable entry slot is even with or just above a top surface of a desk residing against the beam.

2. The cable management and distribution system of claim 1, wherein the bridge includes an upper face with a mounting surface configured for supporting accessories.

3. The cable management and distribution system of claim 1, wherein the data cable passageway comprises a basket which includes horizontally spaced apart closed bottom vertical loops residing over the power cable passageway for providing the data cable passageway vertically spaced apart from the power cable passageway.

4. The cable management and distribution system of claim 3, wherein the basket includes a hand portion along at least one top edge of the basket and the hand portion engages a ledge attached to the bridge and the hand may be disengaged from the ledge to release and reposition the basket to access cables inside the basket.

5. The cable management and distribution system of claim 3, wherein a gap is present between the bottom of the basket and at least one of the beam top edges sufficient to allow a hand to reach into the beam to reach cables or outlets in the power cable passageway and the storage area.

6. The cable management and distribution system of claim 1, wherein the side covers comprise at least one selected from the group consisting of plain vertical covers and vertical covers with accessory tracks.

7. The cable management and distribution system of claim 1, wherein:
the at least one beam top edge comprises two beam top edges residing at the same height and defining highest portions of both sides of the at least one beam;
the at least one side cover comprises two side covers residing at the same height, one on each side of the bridge; and
the cable entry slot comprises two cable entry slots on opposite sides of the at least one beam and defined by vertical gaps between the top edges of the at least one beam and lower edges of the side covers when the side covers are closed.

8. The cable management and distribution system of claim 7, wherein the side covers comprise lift-off side covers hanging from an upper portion of the bridge.

9. The cable management and distribution system of claim 8, wherein the side covers include hooked portions at tops of the side covers and the bridge includes top outside edges configured to cooperate with the hooked portions to hang the side covers from the bridge.

10. The cable management and distribution system of claim 1, wherein the bridge is attached to the posts proximal to tops of the posts and the beam is attached to the posts just below the bridge.

11. A cable management and distribution system comprising:
a first vertical post and a second vertical post;
at least one horizontal beam running between the posts and supported by the posts, the beam having a "U" shaped cross-section and having solid sides and bottom and an open top;
a power cable passageway and storage area in the at least one beam extending the length of the at least one beam and being accessible through the open top of the at least one beam and containing power cables and at least one power outlet;
two beam top edges defining highest portions of each corresponding side of the at least one beam;
a bridge residing vertically spaced apart above the two beam top edges of at least one of the at least one beams and covering the power cable passageway and containing a data cable passageway spaced vertically apart above the power cable passageway and having at least one independently opening vertically residing side cover running the length of the bridge and opening to allow access to both the power cable passageway and the data cable passageway; and
at least one cable entry slot defining a vertical gap, the cable entry slot running substantially the beam length and residing between and defined by the beam top edges and the bottom of the vertically residing side cover of the bridge when the vertically residing side cover is in a vertical closed position, the cable entry slot configured to provide for entry from outside the cable management and distribution system of cables into the power cable passageway and storage area and into the data cable passageway, while the at least one side cover is closed.

12. The cable management and distribution system of claim 11, wherein:
the cable management and distribution system is a free standing cable management and distribution system; and
the horizontal beam is a first horizontal beam, and further including:
a third vertical post, wherein the posts have a square horizontal cross-section; and
a second horizontal beam running between the third vertical post and one of the first vertical post and the second vertical post and supported by the posts, wherein the second horizontal beam is turned with respect to the first horizontal beam to provide a stable free standing cable management and distribution system supported by the posts with no additional support from feet.

13. The cable management and distribution system of claim 11, wherein the at least one independently opening vertically residing side cover comprises two lift-off side covers residing on opposite sides of the bridge, removable to provide hand access to the cable passageway and storage area and to the second cable passageway.

14. The cable management and distribution system of claim 13, wherein the two lift-off side covers are single piece solid lift-off side covers.

15. The cable management and distribution system of claim 11, wherein removing the side cover allows access to both the power cable passageway and the data cable passageway between an upper portion of the bridge and the top edge of the beam and such access is the only access to both the power cable passageway and the data cable passageway.

16. The cable management and distribution system of claim 1, wherein the beam is a single beam attached to the posts just below the bridge and the space below the single beam between the posts and to the floor is free of any structure of the cable management and distribution system.

17. A work area comprising:

free standing furniture having a work surface;

equipment residing on the work surface, the equipment selected from the group consisting of a computer, a printer, a monitor, a keyboard, and a mouse;

cables connected to the equipment;

a free standing cable management and distribution system comprising:
- a first vertically standing post;
- a second vertically standing post;
- a third vertically standing post;
- a first beam having a "U" shaped cross-section and open top and running horizontally between the first post and the second post and supported by the first post and the second post;
- a second beam having a "U" shaped cross-section and open top and running horizontally between the second post and the third post and supported by the second post and the third post;
- each beam having two beam top edges defining highest portions of each corresponding side of each beam the two beam top edges have a height selected from even with or just above the work surface adjacent to the beam;
- each beam defining a power cable passageway and storage area extending the length of the beams and accessible through the open tops;
- a horizontally residing bridge covering at least one of the power cable passageways and residing vertically spaced apart above the two beam top edges of at least one of the two beams and containing a data cable passageway spaced vertically apart above the at least one of the power cable passageways and having at least one independently opening vertically residing side cover running the length of the bridge and opening to allow access to both the power cable passageway and the data cable passageway; and
- cable entry slots defining a vertical gap between and defined by the beam top edges and the bottom of the vertically residing side cover of the bridge, when the vertically residing side cover is in a vertical closed position, the cable entry slot configured to provide for entry from outside the cable management and distribution system of the cables into the power cable passageway and storage area and into the data cable passageway, while the at least one side cover is closed.

18. The work area of claim 17, wherein:

the vertically standing posts are not in a straight line and thereby provide a stable three point support to the free standing cable management and distribution system by the vertically standing posts only with no addition support from feet attached to the posts; and the free standing cable management and distribution system does not extend into the work area beyond the footprint of the posts and beams, thereby eliminating feet which obstruct the positioning of the furniture.

* * * * *